US011292926B2

(12) United States Patent
Gier et al.

(10) Patent No.: US 11,292,926 B2
(45) Date of Patent: Apr. 5, 2022

(54) IMPREGNATE WITH ANTISTATIC PROPERTIES

(71) Applicant: Flooring Technologies Ltd., Kalkara (MT)

(72) Inventors: Andreas Gier, Mandelbachtal (DE); Norbert Kalwa, Horn-Bad Meinberg (DE)

(73) Assignee: Flooring Technologies Ltd., Kalkara (MT)

( * ) Notice: Subject to any disclaimer, the term of this patent is extended or adjusted under 35 U.S.C. 154(b) by 41 days.

(21) Appl. No.: 16/835,788

(22) Filed: Mar. 31, 2020

(65) Prior Publication Data

US 2020/0317936 A1 Oct. 8, 2020

(30) Foreign Application Priority Data

Apr. 2, 2019 (EP) ..................................... 19166831

(51) Int. Cl.
| | | |
|---|---|---|
| *H01B 1/24* | (2006.01) | |
| *C09D 5/24* | (2006.01) | |
| *B32B 27/00* | (2006.01) | |
| *C09D 7/61* | (2018.01) | |
| *B27K 3/52* | (2006.01) | |
| *B32B 21/08* | (2006.01) | |
| *B32B 27/10* | (2006.01) | |
| *B32B 27/32* | (2006.01) | |
| *B32B 27/36* | (2006.01) | |
| *B32B 27/40* | (2006.01) | |
| *B32B 29/00* | (2006.01) | |
| *B32B 29/06* | (2006.01) | |
| *C09D 161/28* | (2006.01) | |
| *D21H 19/12* | (2006.01) | |
| *D21H 21/14* | (2006.01) | |

(52) U.S. Cl.
CPC .................. *C09D 5/24* (2013.01); *B27K 3/52* (2013.01); *B32B 21/08* (2013.01); *B32B 27/10* (2013.01); *B32B 27/32* (2013.01); *B32B 27/36* (2013.01); *B32B 27/40* (2013.01); *B32B 29/005* (2013.01); *B32B 29/06* (2013.01); *C09D 7/61* (2018.01); *C09D 161/28* (2013.01); *D21H 19/12* (2013.01); *D21H 21/14* (2013.01); *H01B 1/24* (2013.01); *B32B 2260/026* (2013.01); *B32B 2260/028* (2013.01); *B32B 2260/046* (2013.01); *B32B 2307/21* (2013.01); *B32B 2307/412* (2013.01); *B32B 2479/00* (2013.01)

(58) Field of Classification Search
CPC .... C09D 5/24; C09D 7/61; B29K 3/52; B32B 27/10; B32B 27/20; B32B 29/06; D21H 19/10; H01B 1/24
See application file for complete search history.

(56) References Cited

U.S. PATENT DOCUMENTS

| | | | |
|---|---|---|---|
| 5,266,384 A | 11/1993 | O'Dell et al. | |
| 5,709,976 A * | 1/1998 | Malhotra | ............... B41M 5/506 347/105 |
| 5,824,462 A * | 10/1998 | Ashida | ..................... G03C 1/79 430/531 |
| 7,122,585 B2 | 10/2006 | Nicholl et al. | |
| 8,835,592 B2 * | 9/2014 | Rukavina | ............... C08G 18/10 528/60 |
| 8,912,279 B2 * | 12/2014 | Nakamura | ............... C08K 3/00 524/612 |
| 2005/0003163 A1 | 1/2005 | Krishnan | |
| 2010/0064938 A1 | 3/2010 | Voit et al. | |
| 2011/0097586 A1 | 4/2011 | Liao et al. | |
| 2019/0126600 A1 | 5/2019 | Braun et al. | |

FOREIGN PATENT DOCUMENTS

| | | |
|---|---|---|
| CN | 105150640 A | 12/2015 |
| EP | 0276691 A1 | 8/1988 |
| EP | 0822240 A1 | 4/1998 |
| EP | 2272668 A1 | 1/2011 |
| EP | 2537653 A1 | 12/2012 |
| EP | 2927018 A1 | 10/2015 |
| EP | 2537597 B1 | 8/2016 |
| EP | 2873523 B1 | 4/2017 |
| EP | 3231519 A1 | 10/2017 |
| EP | 3231596 A1 | 10/2017 |
| KR | 101423280 B1 | 7/2014 |
| RU | 2106974 C1 | 3/1998 |
| WO | 2017207451 A1 | 12/2017 |

\* cited by examiner

*Primary Examiner* — Mark Kopec
(74) *Attorney, Agent, or Firm* — The Webb Law Firm

(57) ABSTRACT

An impregnate with antistatic properties for use in laminates or for coating wood-based panels is disclosed. A resin used for impregnating and/or coating paper may include carbon-based particles, at least one compound of the general formula (I) $R^1_a R^2_b SiX_{(4-a-b)}$, and/or hydrolysis products thereof. X is H, OH, or a hydrolysable moiety selected from the group including halogen, alkoxy, carboxy, amino, monoalkylamino or dialkylamino, aryloxy, acyloxy, or alkylcarbonyl. $R^1$ is an organic moiety selected from the group including alkyl, aryl, or cycloalkyl, which may be interrupted by —O— or —NH—. $R^1$ has at least one functional group $Q^1$ selected from a group including a hydroxy-, amino, monoalkylamino, carboxy, mercapto, alkoxy, aldehyde, acrylic, acryloxy, methacrylic, methacryloxy, cyano, isocyano or epoxide group. $R^2$ is a non-hydrolyzable organic moiety selected from the group including alkyl, aryl, alkenyl, alkynyl, cycloalkyl, cycloalkenyl; a is 0, 1, 2, or 3, and b is 1, 2, 3, or 4.

19 Claims, No Drawings

IMPREGNATE WITH ANTISTATIC PROPERTIES

CROSS-REFERENCE TO RELATED APPLICATION

This application claims priority to European Patent Application No. 19 166 831.8 filed Apr. 2, 2019, the disclosure of which is hereby incorporated by reference in its entirety.

BACKGROUND OF THE INVENTION

Field of the Invention

The present invention concerns an impregnate with antistatic properties, a process for the production thereof, and a laminate and a wood-based panel comprising such an impregnate.

Description of the Related Art

For many articles of daily use, an essential requirement is that no electrostatic charging occurs during use. On the one hand, this is unpleasant, as the electrostatic charge for discharge flows off via the user, and on the other hand it can of course also cause damage to electronic components. In some areas, objects that tend to become electrostatically charged are even prohibited for safety reasons.

For these reasons, manufacturers either try to have a special quality in their product range for special applications or to manufacture all products in at least antistatic quality.

One solution to the problem is to raise the relative humidity by humidification devices. This is a relatively expensive solution that only indirectly remedies the shortcoming.

A much more sustainable solution is to incorporate agents to increase conductivity into the impregnates or impregnated papers used to produce decorative surfaces of consumer goods. However, the problem often arises that the corresponding chemicals are not particularly soluble in the melamine-formaldehyde resins used for impregnation. In addition, these agents often worsen the very good surface properties of the cured melamine resins.

An idea to avoid this problem is described in EP 2 537 597 A1. During the production of a laminate floor, an agent to increase conductivity is applied in sections to a wood-based panel or to the underside of impregnates, the agent being a PVAC or PUR adhesive containing electrically conductive particles. This procedure ensures that no conductivity increasing agent is directly on the surface of the laminate flooring and thus causes a deterioration of the surface properties. However, the paper layer naturally also reduces the required effect.

From U.S. Pat. No. 7,122,585 B2 it is known to apply film-forming polymer compositions with a conductive additive as coating powder on wood materials such as MDF boards. Conductive additives include carbon fibres, carbon nanotubes, activated carbon, metallic fillers, fillers coated with conductive materials or conductive polymers. The coating powder is applied to the wood material using electrostatic methods.

However, the approaches known so far are complex and expensive. The desired effects are also not permanent and product deterioration is accepted.

The present invention was therefore based on the technical object of producing an impregnate which has good electrical conductivity. The aim is to avoid a deterioration of surface properties. The increase in conductivity should also result in the lowest possible costs. In addition, it should be possible to incorporate the agent into a formulation without problems. The use of toxic or environmentally problematic agents should be excluded in any case.

SUMMARY OF THE INVENTION

According to the invention, this object is solved by an impregnate with antistatic properties having the characteristics of the present disclosure.

Accordingly, an impregnate with antistatic properties is provided for use in laminates or for coating wood-based panels, whereby the resin used for impregnating and/or coating the paper comprises
  carbon-based particles, in particular carbon nanotubes (CNT) or graphene,
  at least one compound having the general formula (I)

$$R^1_a R^2_b SiX_{(4-a-b)} \quad (I),$$

and/or their hydrolysis products, wherein
  X is H, OH or a hydrolyzable group selected from the group comprising halogen, alkoxy, carboxy, amino, monoalkylamino or dialkylamino, aryloxy, acyloxy, alkylcarbonyl, and
  $R^1$ is an organic moiety selected from the group comprising alkyl, aryl, cycloalkyl, which may be interrupted by —O— or —NH—
  wherein $R^1$ has at least one functional group $Q_1$ selected from a group containing a hydroxy, amino, monoalkylamino, carboxy, mercapto, alkoxy, aldehyde, acrylic, acryloxy, methacrylic, methacryloxy, cyano, isocyano and epoxy group,
  $R^2$ is a non-hydrolyzable organic moiety selected from the group comprising alkyl, aryl, alkenyl, alkynyl, cycloalkyl, cycloalkenyl;
  a=0, 1, 2, 3, in particular 1 or 2, and
  b=1, 2, 3, or 4, in particular 0 or 1.

In an embodiment of the present impregnate, the resin may also contain at least one other compound of general formula (II)

$$R^3_c SiX_{(4-c)} \quad (II),$$

and/or their hydrolysis products, wherein
  X has the above meaning,
  $R^3$ is a non-hydrolyzable organic moiety $R^3$ is selected from the group comprising alkyl, aryl, alkenyl, alkynyl, cycloalkyl, cycloalkenyl, and
  c=1, 2, 3, or 4, in particular 1, 2 or 3

In a preferred embodiment, the at least one resin comprises
  carbon-based particles, in particular carbon nanotubes (CNT) or graphene,
  at least one compound having the general formula (Ia)

$$R^1_a SiX_{(4-a)} \quad (Ia),$$

and/or their hydrolysis products, and
  at least one further compound of the general formula (II)

$$R^3_c SiX_{(4-c)} \quad (II),$$

and/or their hydrolysis products, wherein X, $R^1$, $R^3$, a and c have the above meaning.

According to this method, a resin is introduced into a paper layer (i.e. the paper is impregnated with the resin) or applied to a paper layer as a resin layer, this resin containing conductivity increasing agents. This agent is added to the resin used anyway, such as melamine-formaldehyde resin.

Carbon-based particles, such as carbon nanotubes, platelets or fibres and also graphene, have proven to be particularly suitable conductivity agents. It has been shown, however, that for good conductivity it is important to be able to incorporate the carbon particles into the resin system without agglomeration. This is the only way to ensure that good electrical conductivity can be established even with small amounts of carbon particles. For this purpose, the carbon particles were modified on their surface with the silane compounds mentioned above. On the one hand, this serves the purpose of avoiding agglomeration and, on the other hand, of establishing a chemical bond with the melamine resin. The particles modified with the silane compounds can be easily incorporated into the resins used for impregnation.

The resulting advantages are a simple, process-technologically uncomplicated solution, a long-lasting effect and a relatively small application quantity, which keeps the overall costs low.

Carbon nanotubes are large macromolecules in the form of graphite films (a hexagonal lattice with sp$^2$ configuration), which are rolled up in the shape of a cylinder ("single-walled carbon nanotubes", SWNT). In addition to single-walled carbon nanotubes, carbon nanotubes with two or more walls are also known ("double walled carbon nanotubes" DWNT; multi-walled carbon nanotubes", MWNT), whereby the latter can be described in the form of a cylinder inserted into another cylinder.

Carbon nanotubes are characterized by high strength, low weight, a specific electronic structure, high stability and excellent electrical but also thermal and conductivity.

Single-walled carbon nanotubes (SWNT), double-walled carbon nanotubes (DWNT) or multi-walled carbon nanotubes (MWNT) can be used as carbon nanotubes (CNT), whereby particularly single-walled carbon nanotubes with a diameter between 1.0-2.5 nm, preferably between 1.5 and 2.0 nm and one between length 2-10 µm, preferably 4-8 µm, particularly preferably 5-6 µm are used.

A possible alternative to the use of carbon nanotubes are nano-layers of graphene. Graphene is a further modification of carbon with a two-dimensional aromatic structure in which each carbon atom is surrounded by three additional carbon atoms so that a honeycomb pattern is formed.

In one embodiment, the amount of carbon-based particles added to the resin is between 1.0 and 4.0 wt %, preferably between 1.5 and 3.5 wt %, particularly preferably between 2.0 and 3.0 wt %, e.g. 2.5 wt %.

The resin used for impregnating and/or coating the paper is preferably based on aqueous formaldehyde-containing resins, in particular melamine-formaldehyde resin, urea-formaldehyde resin, melamine-urea-formaldehyde resin, phenol-formaldehyde resin or mixtures thereof. Additional polymers are not contained in the resin used in this case.

The solids content of the resin containing the carbon-based particles is between 50-75% by weight, preferably 55-70% by weight, and especially preferably 60-65% by weight, The hydrolyzable moiety X of the compounds of the general formula (I), (Ia) and (II) is advantageously selected from a group containing H, OH, fluorine, chlorine, bromine, iodine, $C_{1-6}$-alkoxy, in particular methoxy, ethoxy, n-propoxy and butoxy, $C_{6-10}$-aryloxy, in particular phenoxy, $C_{2-7}$-acyloxy, in particular acetoxy or propionoxy, $C_{2-7}$-alkylcarbonyl, in particular acetyl, monoalkylamino or dialkylamino having $C_1$ to $C_{12}$, in particular $C_1$ to $C_6$. Particularly preferred is the residue X H, OH or alkoxy, especially methoxy, ethoxy, n-propoxy or i-propoxy.

The organic moiety $R^1$ of the compound of the general formula (I), (Ia) is preferably selected from a group comprising $C_1$-$C_{30}$ alkyl, in particular $C_5$-$C_{26}$ alkyl, $C_2$-$C_{26}$ alkenyl, $C_3$-$C_8$ cycloalkyl and $C_3$-$C_8$ cycloalkenyl. In one embodiment the organic moiety $R^1$ is selected from the group containing methyl, ethyl, n-propyl, isopropyl, n-butyl, s-butyl, t-butyl, pentyl, hexyl, cyclohexyl, vinyl, 1-propenyl, 2-propenyl, butenyl, acetylenyl, propargyl, butadienyl or cyclohexadienyl, preferably methyl, ethyl, propyl or vinyl.

In one embodiment, the at least one functional group $Q^1$ of the compound of the general formula (I), (Ia) is selected from a group containing epoxide, hydroxy, ether, acrylic, acryloxy, methacrylic, methacryloxy, amino, alkoxy, cyano and/or isocyano group. The functional group $Q^1$ can therefore advantageously have a residue with a double bond or an epoxy group, which can be activated and polymerized by UV radiation.

In a variant of the present composition, compounds of general formula (I) according to $R^1{}_aR^2{}_bSiX_{(4-a-b)}$, in particular $R^1SiX^3$ or $R^1R^2SiX_2$ with a functional group $Q^1$, may be selected from methacryloxypropyltrimethoxysilane (MPTS), aminoethyl-aminopropyltrimethoxysilane, silanes with an epoxy functionalization such as glycidyl-oxypropyltriethoxysilane, or silanes with a vinyl functionalization such as z.B. Vinyltrimethoxysilane.

As described, the moiety $R^1$ can have at least one functional group $Q^1$. In addition the moiety $R^1$ can also be substituted with other residues.

The term "substituted", in use with "alkyl", "alkenyl", "aryl", etc., means the substitution of one or more atoms, usually H atoms, by one or more of the following substituents, preferably by one or two of the following substituents halogen, hydroxy, protected hydroxy, oxo, protected oxo, $C_3$-$C_7$ cycloalkyl, bicyclic alkyl, phenyl, naphthyl, amino, protected amino, monosubstituted amino, protected monosubstituted amino, disubstituted amino, guanidino, protected guanidino, a heterocyclic ring, a substituted heterocyclic ring, imidazolyl, indolyl, pyrrolidinyl, $C_1$-$C_{12}$ alkoxy, $C_1$-$C_{12}$ acyl, $C_1$-$C_{12}$ acyloxy, acryloyloxy, nitro, carboxy, protected carboxy, carbamoyl, cyano, methylsulfonylamino, thiol, $C_1$-$C_{10}$ alkylthio and $C_1$-$C_{10}$ alkylsulfonyl The substituted alkyl groups, aryl groups, alkenyl groups, can be substituted once or several times and preferably once or twice, with the same or different substituents.

The term "alkynyl", as used here, denotes a moiety of the formula R—C≡C—, in particular a "$C_2$-$C_6$ alkynyl". Examples of $C_2$-$C_6$ alkynyls include: ethynyl, propynyl, 2-butynyl, 2-pentinyl, 3-pentinyl, 2-hexyl, 3-hexyl, 4-hexyl, vinyl, and di- and tri-ins of straight and branched alkyl chains.

The term "aryl", as used herein, refers to aromatic hydrocarbons such as phenyl, benzyl, naphthyl, or anthryl. Substituted aryl groups are aryl groups which are substituted with one or more substituents as defined above.

The term "cycloalkyl" includes the groups cyclopropyl, cyclobutyl, cyclopentyl, cyclohexyl and cycloheptyl.

In a further embodiment, the non-hydrolyzable organic moiety $R^2$ of the compound according to formula (I) and the moiety $R^3$ of the compound according to formula (II) are selected from a group comprising $C_1$-$C_{15}$ alkyl, in particular $C_1$-$C_{10}$ alkyl, $C_2$-$C_6$ alkenyl, $C_2$-$C_6$ alkynyl and $C_6$-$C_{10}$ aryl. These may be unsubstituted or substituted with another hydrophobic group.

It is preferred when the non-hydrolyzable organic moiety $R^2$ and the moiety $R^3$ are selected from the group containing methyl, ethyl, n-propyl, isopropyl, n-butyl, s-butyl, t-butyl, pentyl, hexyl, heptyl, octyl, nonyl, cyclohexyl, vinyl, 1-propenyl, 2-propenyl, butenyl, acetylenyl, propargyl, phenyl and naphthyl. Methyl, ethyl, propyl, octyl, or phenyl residues are particularly preferred.

In the context of the present invention, the term "non-hydrolyzable organic moiety" is to be understood as an organic moiety which, in the presence of water, does not lead to the formation of an OH group or $NH_2$ group linked to the Si atom.

The compound of the general formula (I) may in particular comprise the moiety $R^2$ as $C_1$-$C_{10}$ alkyl group, preferably methyl, ethyl, propyl.

The compound of the general formula (II) may in particular comprise $R^3SiX_3$ with $R^3$ as $C_1$-$C_{10}$ alkyl group, preferably methyl, ethyl, propyl, pentyl, hexyl, heptyl, octyl, or as $C_6$-$C_{10}$ aryl group, preferably phenyl, and with X as alkoxy, in particular methoxy, ethoxy, n-propoxy or i-propoxy, such as octyltriethoxysilane, phenyltriethoxysilane.

In a variant of the present composition, a compound of general formula (Ia) and a compound of general formula (II) are used respectively.

The (molar) ratio of the silane compound of formula (Ia) to the silane compounds of formula (II) is preferably between 1:0.5 and 1:2, in particular preferably between 1:1 and 1:1.5.

In a particularly preferred variant of the present impregnate, the resin comprises carbon nanotubes modified with glycidyloxypropylmethyldiethoxysilane, glycidyloxypropyltriethoxysilane and octyltriethoxysilane, preferably a mixture of glycidyloxypropyltriethoxysilane and octyltriethoxysilane.

In another embodiment, the resin may contain inorganic particles, especially $SiO_2$, $Al_2O_3$, $ZrO_2$, $TiO_2$ particles. The particles preferably used for this purpose have a size between 2 and 400 nm, preferably between 2 and 100 nm, and especially preferably between 2 and 50 nm. The addition of the inorganic particles increases the solids content of the composition, which improves the application behaviour of the composition. The addition of inorganic particles also prevents shrinkage and cracking. The inorganic particles can be used in a quantity range of 0.1 to 25 wt %, preferably 5 to 20 wt %, based on the solids content of the silane material (sol-gel material).

The paper to be impregnated and/or coated with the resin is preferably base paper, or a decorative, kraft or overlay paper with core impregnation; i.e. these papers are already pre-impregnated with a conventional resin (e.g. a melamine-formaldehyde resin), with the modified resin being applied additionally. In the case of base paper, the papers are not pre-impregnated.

Overlay papers are thin papers which are typically already impregnated with a conventional melamine resin. Overlay papers are also available in which abrasion-resistant particles, such as corundum particles, are already mixed into the resin of the overlay to increase abrasion resistance.

Décor papers are special papers for surface finishing of wood-based materials, which allow a wide variety of decors. Thus, in addition to the typical imprints of various wood structures, further imprints of geometric shapes or artistic products are available. There is in fact no restriction in the choice of motif. In order to ensure optimum printability, the paper used must have good smoothness and dimensional stability and also be suitable for penetration of a necessary synthetic resin impregnation.

Kraft papers have a high strength and consist of cellulose fibres to which starch, alum and glue are added to achieve surface effects and increase strength.

In a preferred embodiment, the paper is partially or fully impregnated with the modified resin, whereby the modified resin penetrates or permeates into the paper. In the present case, the term "impregnation" means a complete or partial impregnation of the paper layer with the resin suspension of resin, e.g. formaldehyde resin, and carbon-based particles modified with a silane compound. Such impregnations can be applied e.g. in an impregnation bath, or by brushing, squeegee or spraying.

As mentioned above, it can also be provided that the resin does not penetrate into the paper, but is instead applied to the surface of the paper and remains on the paper layer as a (separate) resin layer. This is particularly the case when using pre-impregnated papers. Here, the at least one resin layer is arranged on at least one surface or side, i.e. the top and/or bottom side, of the impregnate.

Paper weights can vary over a range of 30 to 250 $g/m^2$. For example, the paper weight of décor papers can be between 30 and 150 $g/m^2$, preferably between 50 and 120 $g/m^2$, and especially preferably between 80 and 100 $g/m^2$. In the case of a base paper or kraft paper, the paper weight can be between 50 and 250 $g/m^2$, preferably between 100 and 200 $g/m^2$, and especially between 120 and 150 $g/m^2$.

The resin used to impregnate and/or coat the impregnate can be produced in a process comprising the following steps:
  Providing of at least one (aqueous) resin suspension;
  Adding at least one catalyst, in particular an acid, to the at least one resin suspension;
  Adding of at least one compound of general formula (I) and optionally at least one compound of general formula (II); and
  Dispersing the carbon-based particles in the resin suspension using ultrasound (e.g. 160 W) and a dispersing tool (e.g. Ultraturax from IKA with 15 000 rpm).

Inorganic and/or organic acids suitable as catalysts are selected from a group containing phosphoric acid, acetic acid, p-toluene sulfonic acid, hydrochloric acid, formic acid or sulfuric acid. Also suitable are ammonium salts such as ammonium sulphate, which react as weak acids. p-Toluene sulfonic acid is particularly preferred.

For subsequent neutralization of the reaction mixture, a basic compound such as ammonia is preferably added. This leads to a separation of the aqueous phase with the binder portion from the alcoholic phase (ethanolic phase).

In the case that inorganic particles are added to the binder composition, the inorganic particles are preferably used in an amount between 0.1 to 15% by weight, preferably 0.5 to 10% by weight, especially preferably between 1 to 5% by weight.

The object of the present invention is also solved by a process for producing the described impregnate.

Accordingly, a process for the production of an impregnate with antistatic properties is provided, which comprises the following steps:
  Providing a resin suspension comprising carbon-based particles, at least one compound of the general formula (I) and optionally at least one compound of the general formula (II);
  Providing a paper layer,
  impregnating the paper layer with the resin suspension, preferably in an impregnation channel, and/or coating the paper layer with the resin suspension; and
  Drying of the impregnated and/or coated paper layer.

As mentioned above, the impregnate in question is used to produce laminates with antistatic properties. A laminate is understood here to be a laminate that can be applied to a carrier plate (e.g. by laminating). Laminates are particularly suitable for the production of modern furniture parts, floors and other surfaces.

The present laminate comprises at least one impregnate with antistatic properties, wherein the at least one impregnate can be an overlay impregnate, a decorative impregnate and/or a force impregnate. In a preferred embodiment, the laminate comprises a force impregnate and/or a decorative impregnate as an impregnate with antistatic properties.

In one embodiment of the present laminate, in addition to the at least impregnate, at least one further paper layer (not provided with the present resin), at least one transparent paper layer (pergamin) and/or at least one plastic film layer is provided. The use and number of impregnating agents with antistatic properties and other paper and film layers in the laminate and the layer structure of the laminate is oriented in particular to the later application. The different layers or plies can be contained several times in the laminate structure, alternate or interchange their position. However, it is essential that at least one impregnating agent with antistatic properties is present in the laminate.

The transparent paper used in the laminate is also known as pergamin. Pergamin is a transparent paper made from finely ground cellulose, which is largely greaseproof but not wet-strengthened. It gets its high transparency from very sharp satinage.

A plastic film layer used in a laminate consists of polymers, in particular polypropylene (PP), polyethylene (PE), polyethylene terephthalate (PET), thermoplastic polyurethane (TPU) or polyurethane.

A particularly preferred laminate structure looks as follows (from bottom to top): at least one Kraft impregnate with antistatic properties—at least one transparent paper layer—at least one decor paper layer—at least one overlay paper layer.

The existing laminate or deck has a construction height with a thickness between 0.1 and 3 mm, preferably between 0.1 and 2 mm.

The following process steps are used to produce the laminate after the impregnate has been produced:
Providing at least one impregnate with antistatic properties;
Providing of at least one further impregnation layer, in particular at least one decorative impregnation layer and at least one overlay impregnation layer, at least one transparent impregnation layer and/or a plastic film layer,
Producing a layering of an impregnate with antistatic properties, at least one further impregnation layer, in particular at least one decorative impregnation layer and at least one overlay impregnation layer, at least one transparent impregnation layer and/or a plastic film layer, and
Pressing the layering in a hot press, especially in a continuous or intermittent press (e.g. short cycle press) or a double belt press.

The paper layers can be pressed into a thin laminate in a CPL press, for example.

The pressed laminate (or deck) is then placed or laminated onto a suitable carrier material, in particular a carrier board (e.g. wood-based material carrier board). Lamination shall be carried out using at least one adhesive, in particular a polyurethane adhesive or a thermoplastic adhesive. This usually happens in a laminating line.

As already mentioned above, the impregnate can also be used (directly) to coat a wood-based board.

In this case, a wood-based panel comprising at least one carrier board and at least one impregnate with antistatic properties arranged on at least one side of the carrier board is provided.

It is particularly preferred if the at least one impregnate with antistatic properties is a decorative impregnate. In this case, the decorative impregnate is pressed together with at least one overlay impregnate layer and at least one backing impregnate together with a carrier board.

A particularly preferred structure of a wood-based panel looks as follows (from bottom to top): at least one backing—at least one carrier board—at least one decorative impregnate with antistatic properties—at least one overlay impregnate.

With the present invention it is now possible to provide material sheets with antistatic properties. Thus, on the one hand, a material board is provided, which consists of a carrier board on whose surface an antistatic impregnate is applied and pressed. On the other hand, a material board is provided, which consists of a carrier board with laminate (with antistatic impregnation) arranged and pressed on it.

In both cases, the preferred carrier board is a board made of a wood-based material, plastic, a wood-based material-plastic mixture or a composite material, in particular chipboard, medium density fibreboard (MDF), high density fibreboard (HDF), coarse particleboard (OSB) or plywood, and/or a WPC (wood plastic composite) board.

The invention is explained in more detail below using several examples.

DESCRIPTION OF THE INVENTION

Example 1: Preparation of a First Resin Suspension with Modified Carbon Particles For modification, 90 g (or 80 g) of melamine-formaldehyde resin and 8.5 g (or 17 g) of water are added, followed by 0.08 g (or 0.16 g) of para-toluenesulphonic acid. To this aqueous solution 0.7 g (or 1.4 g) of gylcidyloxypropyltriethoxysilane and 0.16 g (or 0.32 g) of ocytyltriethoxysilane are added.

Then 1.5 g (or 3 g) of CNTs are dispersed in the solution using ultrasound and high shear (15 000 rpm ultraturray) and stirred at 40° C. for 30 minutes. This solution can now be processed like a normal resin system. (In parentheses are the specifications for the sample with 3% CNT in the resin)

Example 2: Preparation of a Second Resin Suspension with Modified Carbon Particles For modification, 98.5 g water is added and then 0.08 g para-toluenesulfonic acid. To this aqueous solution 0.7 g of gylcidyloxypropyltriethoxysilane and 0.16 g of ocytyltriethoxysilane are added.

Subsequently, 1.5 g CNTs are dispersed in the solution using ultrasound and high shear forces (15 000 rpm ultraturray) and stirred at 40° C. for 30 minutes. This pure aqueous solution can now be dosed to melamine resin directly at the application machine.

Example 3: Production of a First Impregnate

In an impregnation channel, a printed decorative paper (paper weight: 80 g/m$^2$) is subjected to a core impregnation in the first impregnation bath. The impregnation is carried out with a standard melamine resin, which contains the usual additives (hardeners, wetting agents, defoamers, etc.) in normal quantities. The impregnating liquor had a solids content of approx. 65 wt %.

To ensure that only a core impregnation was achieved, the decorative paper was sharply peeled off on both sides with a knife blade after impregnation. The resin application was approx. 80 wt % solid resin.

The impregnate was dried in a floatation dryer and then coated on the back with a melamine resin in a screen unit. In addition to the usual auxiliary materials, the impregnate contained approx. 2.5% by weight carbon nanotubes from example 2. Approx. 30 g resin fl./m² were applied.

The impregnate was dried in a second air flotation dryer to a residual moisture content of approx. 6% by weight. The impregnate was cut to size and stacked.

The decorative impregnate was pressed onto a large-format HDF (2.8×2.07 m, 8 mm) at approx. 200° C., 15 sec. and 40 kg/cm² with an overlay and a backing in a KT press. Then a sample 50×50 cm was cut out of the large-format panel and conditioned for two weeks at 50% relative humidity, 23° C.

Then the surface resistance was determined on the sample in accordance with DIN EN 1081: 2018. This resulted in a value of $1.0 \times 10^9 \Omega$. A value of $5 \times 10^{12} \Omega$ was found for a zero sample without carbon nanotubes Example 4: Production of a Second Impregnate In an impregnation channel, a printed decorative paper (paper weight: 80 g/m²) is impregnated with a melamine resin in the first impregnation bath. The impregnation is carried out with a standard melamine resin in which the usual additives (hardeners, wetting agents, defoamers etc.) were contained in the normal quantities. The solids content in the resin was approx. 65 wt %. In addition, the resin contained approx. 2.5% by weight carbon nanotubes from example 2.

After the squeeze rolls, approx. 140 g resin fl./m² were still contained in the decor paper. The impregnate was dried in an air flotation dryer to a residual moisture content of approx. 6% by weight. The resin application rate was approx. 110% by weight. The impregnate was then cut to size and stacked.

The decorative impregnate was pressed onto a large-format HDF (2.8×2.07 m, 8 mm) at approx. 200° C., 15 sec. and 40 kg/cm² with an overlay and a backing in a KT press. Then a sample 50×50 cm was cut out of the large-format panel and conditioned for two weeks at 50% relative humidity, 23° C.

Then the surface resistance was determined on the sample in accordance with DIN EN 1081: 2018. This resulted in a value of $8.0 \times 10^8 \Omega$. A value of $5 \times 10^{12} \Omega$ was found for a zero sample without carbon nanotubes.

Example 5: Production of a Third Impregnate

A soda kraft paper (paper weight: 150 g/m²), which is to serve as the core layer for a CPL continuous produced laminate), is subjected to impregnation in an impregnation channel. An impregnating resin consisting of approx. 65% by weight of melamine resin and 35% by weight of a phenolic resin is placed in an impregnation trough. The two resins had a solids content of approx. 65 wt %. The total solids content after addition of the auxiliary materials and water was approx. 60% by weight. The resin mixture contained the usual additives (hardeners, wetting agents, defoamers, etc.) in normal quantities. In addition, the resin contained approx. 2.5 wt % carbon nanotubes from example 2.

The soda kraft paper was impregnated with the impregnating resin in the impregnating trough. After the squeeze rolls, the soda kraft paper still contained approx. 215 g resin fl./m². The impregnate was dried in an air flotation dryer to a residual moisture content of approx. 6% by weight. The resin application rate was approx. 85 wt %. The impregnate was then rolled up.

The force impregnate was pressed with an overlay impregnate, a decorative impregnate and a pergament in a CPL press to form a thin laminate (T=approx. 200° C., v=15 m/min and 60 kg/cm²). Then a sample 50×50 cm was cut out of the laminate and conditioned for two weeks at 50% relative humidity, 23° C.

Then the surface resistance was determined on the sample in accordance with DIN EN 1081: 2018. This resulted in a value of $6.0 \times 10^8 \Omega$. A value of $9 \times 10^{11} \Omega$ was found for a zero sample without carbon nanotubes.

The invention claimed is:

1. An antistatic impregnated and/or coated paper for use in laminates or for coating wood-based panels, wherein at least one resin used for impregnating and/or coating the paper consists of a formaldehyde containing resin and comprises:
    carbon-based particles;
    at least one compound having the general formula (Ia):

$$R^1_a SiX_{(4-a)} \quad (Ia),$$

and/or hydrolysis products thereof,
        wherein X is H, OH, or a hydrolyzable moiety selected from the group comprising halogen, alkoxy, carboxy, amino, monoalkylamino or dialkylamino, aryloxy, acyloxy, and alkylcarbonyl,
        wherein $R^1$ is an organic moiety selected from the group comprising alkyl, aryl, $C_2$-$C_6$ alkenyl, $C_3$-$C_8$ cycloalkenyl, and cycloalkyl, which may be interrupted by —O— or —NH—,
        wherein $R^1$ has at least one functional group $Q_1$ selected from a group comprising a hydroxy, amino, monoalkylamino, carboxy, mercapto, alkoxy, aldehyde, acrylic, acryloxy, methacrylic, methacryloxy, cyano, isocyano and epoxy group,
        wherein a is 1 or 2; and
    at least one further compound of the general formula (II):

$$R^3_c SiX_{(4-c)} \quad (II),$$

and/or hydrolysis products thereof,
        wherein X has the above meaning,
        wherein $R^3$ is a non-hydrolyzable organic moiety selected from the group comprising alkyl, aryl, alkenyl, alkynyl, cycloalkyl, and cycloalkenyl, and
        wherein c is 1, 2, or 3.

2. The antistatic impregnated and/or coated paper according to claim 1, wherein X is selected from a group comprising H, OH, fluorine, chlorine, bromine, iodine, $C_{1-6}$ alkoxy, $C_{6-10}$ aryloxy, $C_{2-7}$ acyloxy, and $C_{2-7}$ alkylcarbonyl.

3. The antistatic impregnated and/or coated paper according to claim 1, wherein $R^1$ is selected from a group comprising $C_1$-$C_{30}$ alkyl, $C_2$-$C_6$ alkenyl, $C_3$-$C_8$ cycloalkyl, and $C_3$-$C_8$ cycloalkenyl.

4. The antistatic impregnated and/or coated paper according to claim 1, wherein the at least one functional group $Q^1$ is selected from a group comprising epoxy, hydroxy, ether, acrylic, acryloxy, methacrylic, methacryloxy, amino, alkoxy, cyano, and isocyano group.

5. The antistatic impregnated and/or coated paper according to claim 1, wherein the non-hydrolyzable organic moiety $R^3$ is selected from a group comprising $C_1$-$C_{15}$ alkyl, $C_2$-$C_6$ alkenyl, $C_2$-$C_6$ alkynyl, and $C_6$-$C_{10}$ aryl.

6. The antistatic impregnated and/or coated paper according to claim 5, wherein the non-hydrolyzable organic moiety $R^3$ is selected from a group comprising $C_1$-$C_{10}$ alkyl.

7. The antistatic impregnated and/or coated paper according to claim 1, wherein the paper to be impregnated and/or coated with the at least one resin is a decorative, kraft, overlay, or base paper.

8. The antistatic impregnated and/or coated paper according to claim 1, wherein the at least one resin used for impregnation and/or coating is an aqueous formaldehyde-containing resin.

9. The antistatic impregnated and/or coated paper according to claim 8, wherein the aqueous formaldehyde-containing resin is a melamine-formaldehyde resin, urea-formaldehyde resin, melamine-urea-formaldehyde resin, phenol-formaldehyde resin or mixtures thereof.

10. The antistatic impregnated and/or coated paper according to claim 1, wherein the solid content of the resin is between 50 and 75% by weight.

11. The antistatic impregnated and/or coated paper according to claim 10, wherein the solid content of the resin is between 55 and 70% by weight.

12. The antistatic impregnated and/or coated paper according to claim 11, wherein the solid content of the resin is between 60 and 65% by weight.

13. A process for producing an antistatic impregnated and/or coated paper according to claim 1, the process comprising the steps of:

providing a resin suspension consisting of a formaldehyde containing resin and comprising carbon-based particles, at least one compound of the general formula (Ia), and at least one further compound of the general formula (II);

providing a paper layer;

impregnating the paper layer with the resin suspension and/or coating the paper layer with the resin suspension; and drying the impregnated and/or coated paper layer.

14. The process according to claim 13, wherein the paper layer is impregnated with the resin suspension in an impregnation channel.

15. A laminate comprising at least one antistatic impregnated and/or coated paper according to claim 1.

16. The laminate according to claim 15, wherein the at least one antistatic impregnated and/or coated paper is a Kraft impregnate and/or a decorative impregnate.

17. A wood-based panel comprising at least one carrier board and at least one antistatic impregnated and/or coated paper according to claim 1 arranged on at least one side of the carrier board.

18. The wood-based panel according to claim 17, wherein the at least one antistatic impregnated and/or coated paper is a decorative impregnate.

19. The antistatic impregnated and/or coated paper according to claim 1, wherein the carbon based particles are carbon nanotubes or graphene.

* * * * *